Feb. 11, 1964 — E. W. ZINGSHEIM — 3,120,697
METHOD OF MAKING TURBINE BLADING
Filed May 6, 1960

INVENTOR.
EDWARD W. ZINGSHEIM
BY Walter E. Pavlick
ATTORNEY 3,120,697
METHOD OF MAKING TURBINE BLADING
Edward W. Zingsheim, Toledo, Ohio, assignor to Dana
Corporation, Toledo, Ohio, a corporation of Virginia
Filed May 6, 1960, Ser. No. 27,364
1 Claim. (Cl. 29—156.8)

This invention relates generally to turbine blading, and more specifically to a process of manufacturing turbine blading, assembling the same in a turbine, compressor or the like, and to the finished structure produced thereby.

A commonly used process of manufacturing and assembling turbine blading consists of forming individual blades with trunnions on their ends, passing these trunnions through holes in the turbine member, and then either riveting over the protruding end or joining it to the turbine member by welding or brazing.

The above operation proves unsatisfactory from a cost standpoint, for each blade requires separate manufacturing and assembling, and is also very time-consuming and wasteful.

Due to recent improvements in the art of casting, precision turbine blades can now be cast. By casting these blades to finished dimensions, the high labor and material cost of machining the blades can be avoided. The present invention takes advantage of precision cast blades, and also provides for casting a plurality of these blades on a common backing strip. This backing strip is then assembled to the turbine member with the result that further savings are realized since individual assembling of the blades is eliminated. Furthermore, holes are not needed in the turbine member since blade trunnions are not utilized; therefore, a source of fluid leakage is eliminated.

It is, therefore, an object of this invention to provide a method of manufacturing turbine blading for a member which materially reduces the time and labor involved in forming such blading.

It is another object of this invention to provide an improved method of manufacturing turbine blading for a member which entirely eliminates machining the turbine blades and also eliminates providing the blades with trunnions.

It is a still further object of this invention to provide an improved method of manufacturing turbine blading which is relatively easy, rapid, and inexpensive.

Further and more specific objects and advantages of this invention will be readily apparent from the following description and a consideration of the accompanying illustrations wherein.

Figures 1, 2, 3, 4:
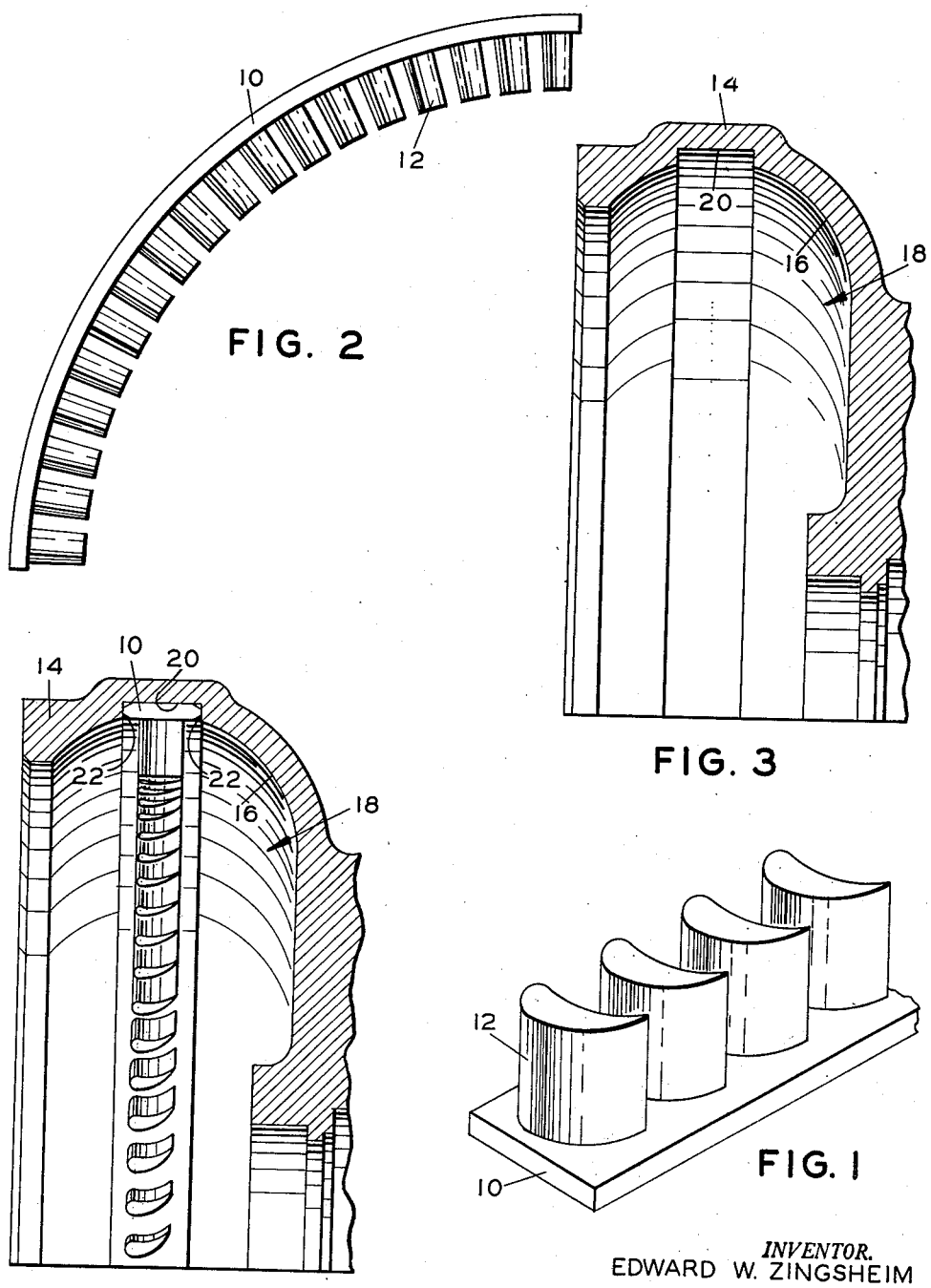
FIG. 1 is a fragmental perspective view of a cast backing strip with a plurality of turbine blades cast integral thereto.
FIG. 2 is an elevation view of the structure shown in FIG. 1 after it has been arcuately deformed. This structure can also be obtained by originally casting the same in this configuration.
FIG. 3 is a sectional view of a portion of a turbine housing or torus ring.
FIG. 4 is a sectional view of the portion of a turbine housing or torus ring illustrated in FIG. 3 showing the backing strip fixedly attached thereto.

Referring now to the drawings and more particularly to FIG. 1, a substantially flat elongated backing strip 10 is provided with turbine blades 12 extending therefrom. The blades 12 extend at right angles to the plane of the backing strip 10 and are spaced equally one with respect to the other along the backing strip 10. The blades 12 are of curved configuration and in cross section are provided with a thickened portion at one end which progressively decreases to a slender portion at the other end.

The backing strip 10 is bent into an arc as shown in FIG. 2 with the blades 12 projecting inwardly therefrom along radii of the arc. The arc is here shown as being a quarter of a circle merely as a matter of convenience since other portions of a circle or the entire circle may also be utilized. It should be also noted that the configuration shown in FIG. 2 may be originally cast to that shape rather than casting the backing strip 10 flat and bending the same as described above.

To mount the backing strip 10, a turbine housing or torus ring 14, only a quarter thereof being shown, has an inner wall 16 defining an annular fluid chamber 18. The inner wall 16 is provided with an annular recess or groove 20 of a width substantially equal to the width of the backing strip 10. The groove 20 is usually provided by machining the finished housing 14. The backing strip 10 is fitted into the annular groove 20 and fixedly secured therein by a plurality of circumferentially spaced spot welds 22.

While only a single quadrant of the turbine housing or torus ring 14 has been shown it is obvious that the remaining three quadrants are provided with backing strips similar to backing strip 10 to provide a complete annular ring of turbine blades 12.

From the foregoing it is apparent that a plurality of turbine blades have been constructed in a turbine casing as unit sub-assemblies, rather than individual blades, thus materially reducing the construction cost. Furthermore, holes are not needed in the turbine housing 14 since the backing strips are merely inset therein, thus external leakage is prevented.

It is apparent from the above description that a method of manufacture and a structure have been provided which are simpler and less expensive than structures heretofore known. It should be understood that it is not desired to limit this invention to the exact procedure and structure shown herein and described except insofar as the invention is limited by the following claim.

I claim:

A method of manufacture comprising the steps of providing a turbine member having an annular groove therein, casting a plurality of backing strips each having a back side adapted to be positioned in the annular groove and a front side with a plurality of turbine blades cast integrally therewith and extending therefrom intermediate the lateral portions of the strip so that the strip extends laterally beyond the blades, bending the backing strip into an arcuate shape with the blades projecting inwardly and fixedly securing the backing strip in the annular groove in the turbine member.

References Cited in the file of this patent

UNITED STATES PATENTS

| | | |
|---|---|---|
| 868,419 | Emmet | Oct. 15, 1907 |
| 905,460 | Rice | Dec. 1, 1908 |
| 1,466,324 | Wilkinson | Aug. 28, 1923 |
| 1,470,499 | Steenstrup | Oct. 9, 1923 |
| 2,640,679 | Wheatley et al. | June 2, 1953 |
| 2,772,069 | Hockert et al. | Nov. 27, 1956 |
| 2,937,805 | Warnken | May 24, 1960 |

FOREIGN PATENTS

| | | |
|---|---|---|
| 288,626 | Germany | Nov. 9, 1915 |
| 255,672 | Great Britain | July 29, 1926 |